US010486787B2

(12) United States Patent
McCummins et al.

(10) Patent No.: US 10,486,787 B2
(45) **Date of Patent: *Nov. 26, 2019**

(54) SHIPBOARD AUDITORY SENSOR

(71) Applicant: Leidos, Inc., Reston, VA (US)

(72) Inventors: Robert J. McCummins, Long Beach, MS (US); Steven M. Johnson, Long Beach, MS (US); Glenn H. May, Gulfport, MS (US)

(73) Assignee: Leidos, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,805

(22) Filed: Oct. 5, 2018

(65) Prior Publication Data

US 2019/0106188 A1 Apr. 11, 2019

Related U.S. Application Data

(60) Division of application No. 15/635,106, filed on Jun. 27, 2017, now Pat. No. 10,131,414, which is a (Continued)

(51) Int. Cl.

*B63B 43/18* (2006.01)
*B63H 25/04* (2006.01)
*H04R 1/40* (2006.01)
*H04R 3/00* (2006.01)
*G01S 13/93* (2006.01)

(52) U.S. Cl.

CPC ............. *B63H 25/04* (2013.01); *B63B 43/18* (2013.01); *H04R 1/406* (2013.01); *H04R 3/005* (2013.01); *H04R 2201/401* (2013.01); *H04R 2410/03* (2013.01); *H04R 2499/13* (2013.01)

(58) Field of Classification Search

CPC . H04R 1/02; H04R 1/406; H04R 3/00; H04R 3/005; H04R 3/12; H04R 29/00; H04R 2499/13; H04R 2101/401; H04R 2410/03; H04R 2201/00; H04R 2201/02; H04R 2201/025; H04R 2203/00; B63B 43/00; B63B 43/18; B63B 45/08; B63H 25/02; B63H 25/04; B63H 25/045;

(Continued)

(56) References Cited

U.S. PATENT DOCUMENTS 2,496,031 A 1/1950 Anderson et al. ............ 177/352
3,588,803 A 6/1971 Fleming, Jr. .................. 340/566

(Continued)

FOREIGN PATENT DOCUMENTS

JP 2002181618 6/2002
WO WO 95/27908 10/1995 ............. G01S 3/802

OTHER PUBLICATIONS

U.S. Department of Homeland Security, United States Coast Guard, "Navigation Rules, International—Inland," Rules 34 and 35, 15 pp., effective Jul. 15, 1977.

*Primary Examiner* — Thang V Tran
(74) *Attorney, Agent, or Firm* — Dawn-Marie Bey; Bey & Cotropia PLLC

(57) ABSTRACT

A Shipboard Auditory Sensor (SAS) for detection and classification of acoustic signaling at sea is capable of detecting whistles blasts from other vessels in accordance with Rules 34 and 35 of COLREGS to support autonomous operations in a maritime environment.

19 Claims, 10 Drawing Sheets

Related U.S. Application Data continuation of application No. 15/007,788, filed on Jan. 27, 2016, now Pat. No. 9,771,139.

(60) Provisional application No. 62/109,332, filed on Jan. 29, 2015.

(58) Field of Classification Search
CPC ...... G01S 13/93; G01S 13/9307; G01S 15/02; G01S 15/04; G01S 15/06; G08G 3/02
See application file for complete search history.

(56) References Cited

U.S. PATENT DOCUMENTS

| | | | | |
|---|---|---|---|---|
| 3,747,057 | A | 7/1973 | Brougher | 340/16 R |
| 4,489,442 | A * | 12/1984 | Anderson | H04R 27/00<br>381/103 |
| 7,106,876 | B2 * | 9/2006 | Santiago | H04R 1/406<br>379/420.03 |
| 9,771,139 | B2 | 9/2017 | McCummins et al. | |
| 9,963,215 | B2 * | 5/2018 | Sidki | B63H 25/04 |
| 2009/0184862 | A1 | 7/2009 | Stayton et al. | 342/30 |
| 2009/0271054 | A1 * | 10/2009 | Dokken | G01S 13/9307<br>701/21 |
| 2011/0022316 | A1 | 1/2011 | Bendito Vallori | 701/301 |
| 2013/0282210 | A1 | 10/2013 | Kolar et al. | 701/21 |
| 2014/0266793 | A1 | 9/2014 | Velado et al. | 340/870.16 |
| 2017/0227639 | A1 | 8/2017 | Stokes et al. | |

* cited by examiner

SHIPBOARD AUDITORY SENSOR

CROSS-REFERENCE TO RELATED APPLICATIONS

The present application is a division of U.S. application Ser. No. 15/635,106, filed Jun. 27, 2017, titled "Shipboard Auditory Sensor," which is a continuation of U.S. application Ser. No. 15/007,788, filed Jan. 27, 2016, titled "Shipboard Auditory Sensor," now U.S. Pat. No. 9,771,139 which claims the benefit of priority to U.S. provisional patent application No. 62/109,332 filed Jan. 29, 2015, titled "Shipboard Auditory Sensor," all of which are incorporated herein by reference in their entirety.

BACKGROUND OF THE EMBODIMENTS

Field of the Embodiments

The embodiments are directed to a Shipboard Auditory Sensor (SAS) for detection and classification of acoustic signaling at sea. More particularly, the embodiments are directed to a SAS maritime sensor that is capable of detecting whistle blasts from other vessels in accordance with Rules 34 and 35 of COLREGS to support autonomous operations in a maritime environment. For example, when vessels are in restricted visibility they use a whistle to signal/communicate if they are a powered vessel underway but stopped, have restricted maneuverability, are under tow, etc.

Description of the Related Art

The increasing number of diesel-electric submarines presents a challenge to the United States naval forces. Accordingly, there is a critical need to offset the risk posed by such small and quiet subs. In order to do so, the ability to locate and track the subs is of paramount importance. To meet this need, the Defense Advanced Research Projects Agency (DARPA's) is supporting the Anti-Submarine Warfare (ASW) Continuous Trail Unmanned Vessels (ACTUV) project to develop an unmanned surface vessel that will be able to locate and track submarines deep under the water, at levels of precision, persistence and flexibility beyond those capabilities available by manned surface ships operating anti-submarine warfare. Such capabilities will become particularly important as the US Naval missions are focused toward littorals in the Hormuz Straits, the Persian Gulf, South China Sea, East Africa, the Mediterranean and the Caribbean Sea.

The vessel is designed to operate fully autonomously, thus providing a forward deployed and rapid-responsive asset in the global maritime surveillance network. With the planned implementation, the ACTUV is intended to be capable of rapid response and autonomous travel to arrive as soon as possible in the area of operation.

In order to achieve the advanced level of autonomy required to enable independently deploying systems to operate on missions spanning thousands of miles in range and months of endurance, under a sparse remote supervisory control model, the ACTUV autonomous operations must comply with maritime laws and conventions for safe navigation. More particularly, the system and method must be able to autonomously collect and process data to guide the vessel arbitration process in deciding which way to turn, how fast to go, obstacle avoidance, and mission monitoring.

Critical sensor data required for supporting successful autonomous operations of a vessel at sea is sensor data indicating the status of other vessels in the projected path or vicinity of the autonomous vessel. Accordingly, there is a need for an improved sensor for determining third-party vessel status to feed the autonomy engine for navigating the ACTUV.

SUMMARY OF THE EMBODIMENTS

In a first exemplary embodiment, a shipboard auditory sensor system for processing audio signals from one or more surface maritime vessels in a vicinity of the ship to support autonomous navigation of the ship includes: an auditory sensor assembly located topside on the ship such that the auditory sensor assembly has a clear line of sight to surface maritime vessels on any bearing, the auditory sensor assembly including: multiple microphone assemblies; a power filter; and a data acquisition board, wherein the auditory sensor assembly receives audio signals from one or more surface maritime vessels in a vicinity of the ship, the received audio signals being in a first auditory range specified by one or more regulations and being indicative of a status of the one or more surface maritime vessels, further wherein the auditory sensor assembly formats the audio signals into audio data packets to support autonomous navigation of the ship.

In a second exemplary embodiment, a shipboard auditory sensor system for processing audio signals from one or more surface maritime vessels in a vicinity of the ship to support autonomous navigation of the ship includes: an auditory sensor assembly including a microphone sensor array for sensing audio signals from one or more surface maritime vessels in a vicinity of the ship, the received audio signals being in one of a first specified auditory range and being indicative of a status of the one or more surface maritime vessels, wherein the auditory sensor assembly formats the audio signals into audio data packets to support autonomous navigation of the ship; and a processing server on the ship for receiving the audio data packets from the auditory sensor assembly, the processing server being programmed to run the received audio data packets through multiple algorithms to support autonomous navigation of the ship.

BRIEF DESCRIPTION OF THE FIGURES

The following figures illustrates various features of the present embodiments and are intended to be considered with the textual detailed description provided herein.

DETAILED DESCRIPTION

Figure 1:
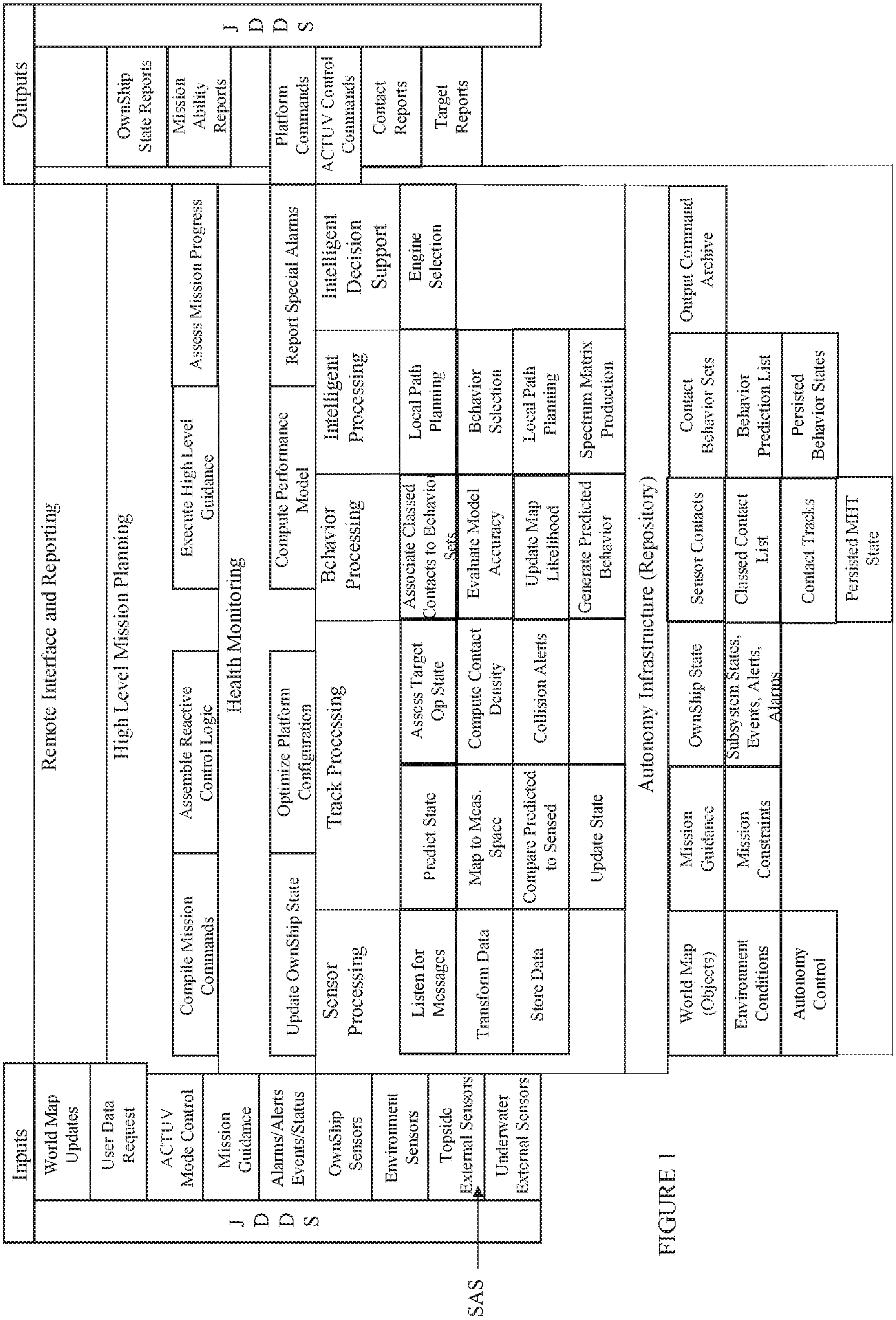
FIG. 1 provides an autonomy system context diagram for an Anti-Submarine Warfare (ASW) Continuous Trail Unmanned Vessels (ACTUV) incorporating inputs from a SAS in accordance with embodiments described herein.

The SAS embodiments described herein are used in a larger system for supporting autonomous maritime operations such as that depicted schematically in FIG. 1. Related features are also described in commonly owned U.S. patent application Ser. No. 14/968,161 entitled System and Method for Fusion of Sensor Data to Support Autonomous Maritime Vessels.

In the embodiments described herein, the SAS is designed to continuously monitor the acoustic environment in the vicinity of the autonomous vessel upon which it is deployed and to discriminate from that acoustic environment sounds which might be considered as signaling protocols for other vessels in the vicinity. All ships at sea are required to carry acoustic signaling devices to be used when coordinating their movement and that of another vessel on a collision course. The Captains and Masters of all ships are required to know and implement the signaling protocols using these devices. In today's world most ships carry radar and radio sets and they use these to great advantage in coordinating their course changes around other vessels, however they are still required to use and respond to the acoustic signaling protocols' when necessary. These acoustic signaling protocols are defined in the International Regulation for Preventing Collisions at Sea 1972 (COLREGS) Annex III which is incorporated herein by reference in its entirety. The SAS hardware and software system described and illustrated herein, detects COLREGS horn or bell events and then generates COLREGS Rule 34 (Maneuvering and warning) or COLREGS Rule 35 (signals in restricted visibility) messages using an output Ethernet interface.

Figure 2:
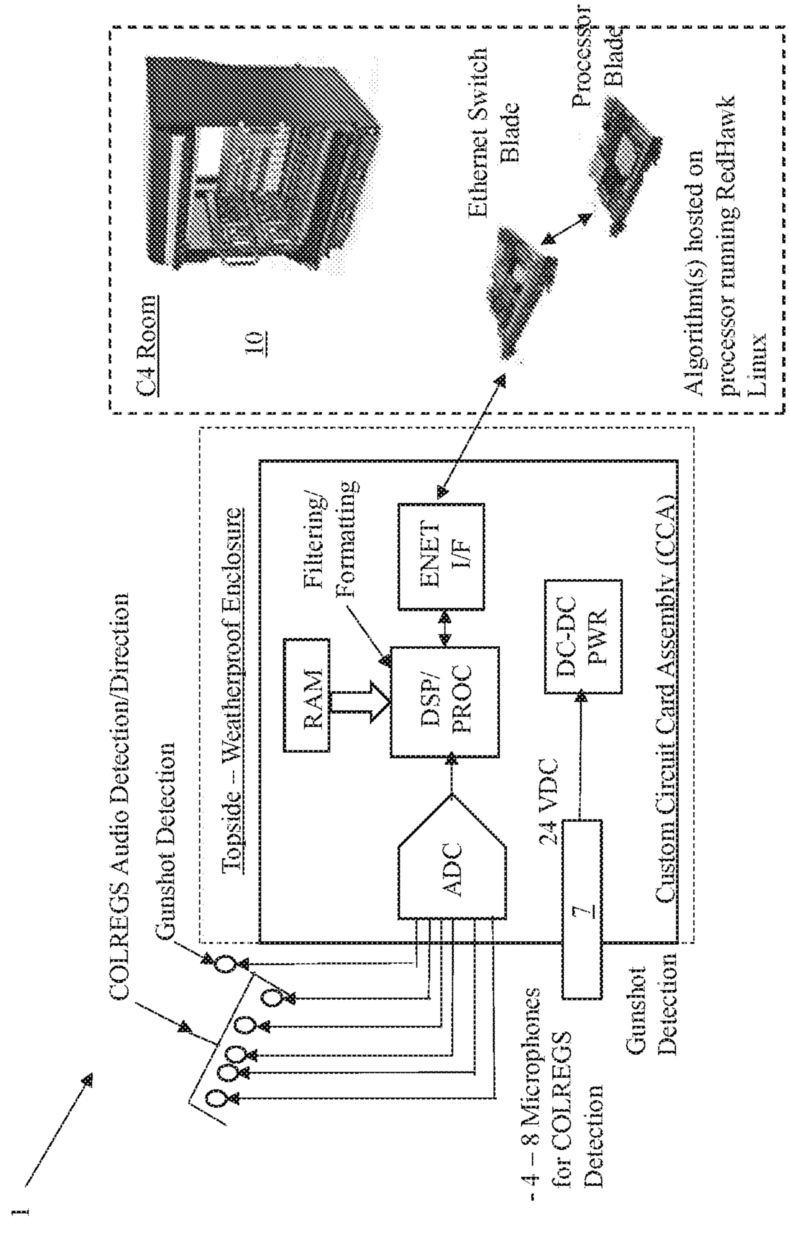
FIG. 2 provides a schematic of a SAS system in accordance with embodiments described herein.

Referring to FIG. 2 a high level operational schematic of the SAS system 1 of the present embodiments is shown. An exemplary SAS system 1 includes: the SAS topside hardware assembly 5, including the auditory sensor components (see FIGS. 3 through 8 and accompanying descriptions below), data processing hardware/software (analog-to-digital signal converter (ADC), digital signal processor (DSP) for filtering, processing and formatting received data signals with random access memory (RAM)) and interfaces (e.g., Ethernet interface) to one or more below deck SAS servers 10 running processing software which includes sound detection algorithm programming, COLREGS classification algorithm programming, and specified operating environment for the SAS. As discussed further herein, each SAS hardware assembly includes at least microphones, preamplifiers, analog to digital conversion boards and Ethernet connections. The SAS system further includes software interfaces for control and messaging. FIG. 2 also illustrates a contemplated additional dedicated gunshot auditory component 7 for detection of gunshots in the vicinity of the autonomous vessel. An exemplary component for such gunshot and other battlefield signatures and acoustic blasts/bursts could be the B-AMMS boat mounted sensor provided by Microflown Maritime which may be housed with the auditory sensor components topside as shown in FIG. 2.

While the SAS system 1 of FIG. 2 is described above as being an Ethernet based network, wherein the data flow is wired, alternative embodiments contemplate wireless communications of the SAS data in accordance with various wireless protocols and technologies known to those skilled in the art.

Figure 3A:
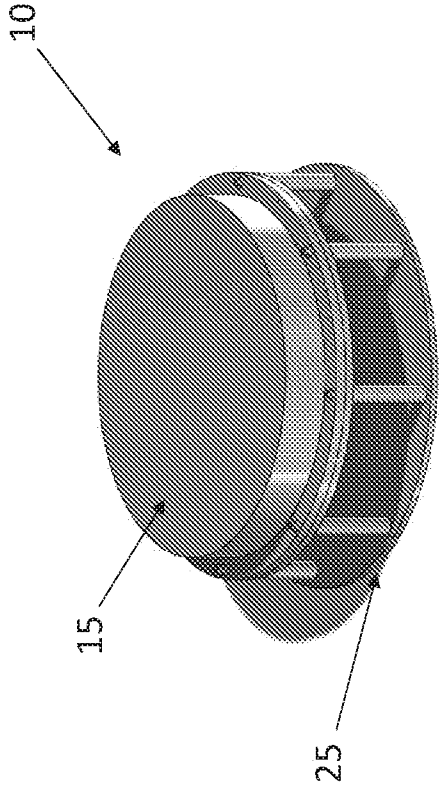
FIGS. 3*a*-3*c* provide various views of an exemplary SAS in accordance with embodiments described herein.
Figure 3B:
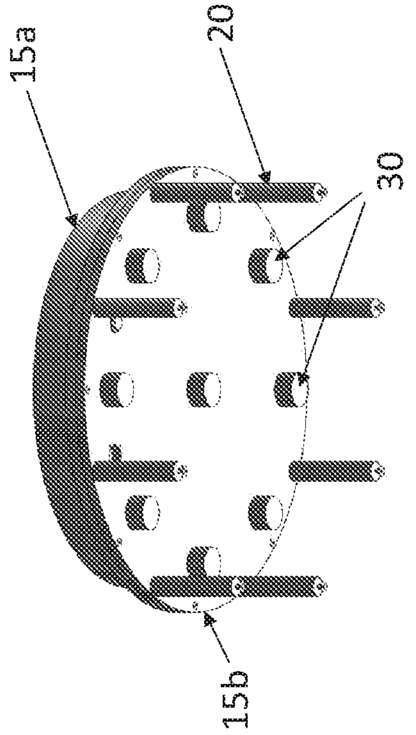
Figure 3C:
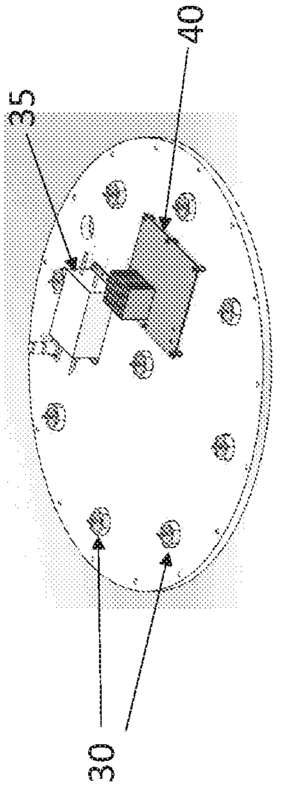

Referring to FIGS. 3*a*-3*c*, an exemplary SAS hardware assembly 5 includes: microphone array housing 15 having top surface 15*a* and bottom surface 15*b*; spacers 20, bottom plate 25 and first end individual microphone assemblies 30. FIG. 3*c* illustrates the non-exposed face of bottom surface 15*b* showing a second end of microphone assemblies 30, power filter 35 and SAS data acquisition (DAQ) Circuit Card Assembly (CCA) (hereafter "Board") 40. Exemplary, non-limiting SAS hardware assembly 10 dimension is 24 inches diameter, 10 inches in height.

Figure 4C:
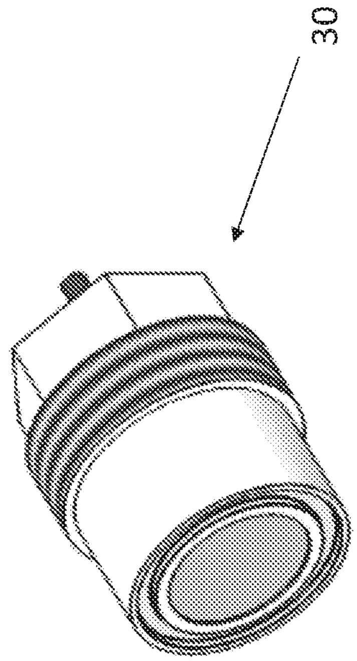
FIGS. 4*a*-4*c* provide detailed illustrations of an exemplary individual microphone assembly of a SAS in accordance with embodiments described herein.
Figure 4A:
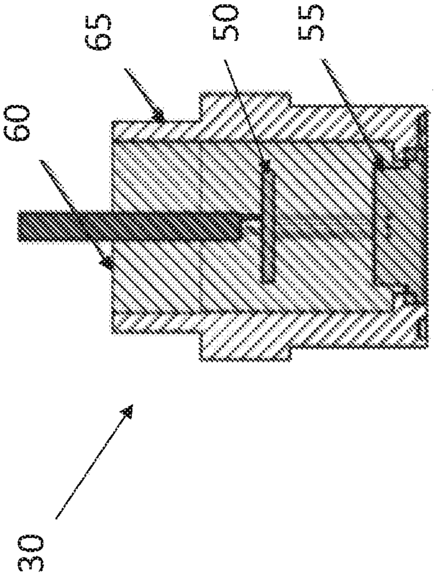
Figure 4B:
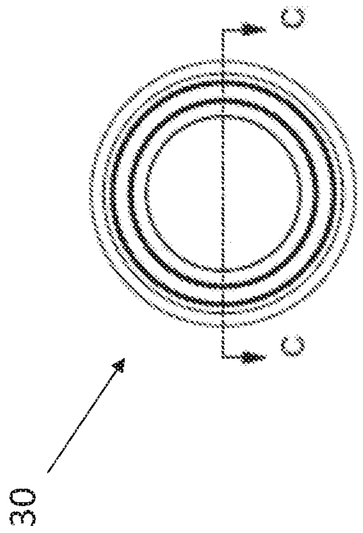

FIGS. 4*a*-4*c* are detailed illustrations of an exemplary individual microphone assembly 30 which includes pre-amplifier 50 and waterproof microphones 55 held in microphone assembly housing 65 by epoxy 60.

Figure 5C:
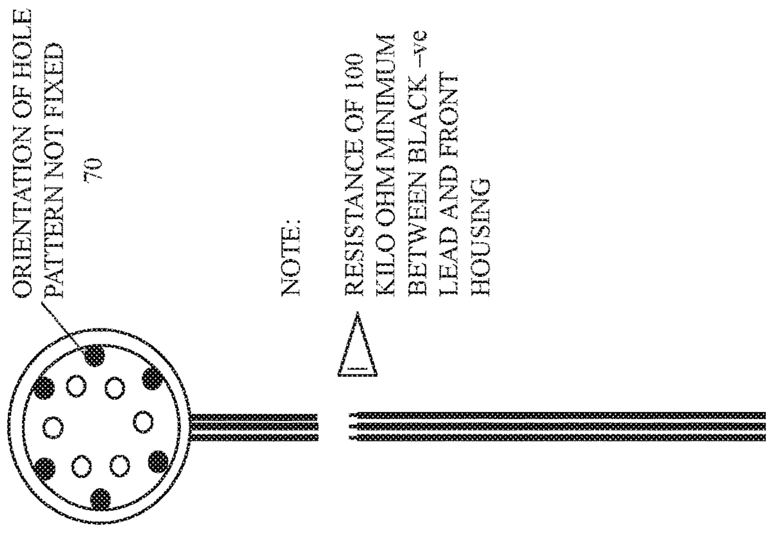
FIGS. 5*a*-5*c* provide top, side and bottom illustrations of an exemplary microphone of the microphone assembly of FIGS. 4*a*-4*c;*
Figure 5B:
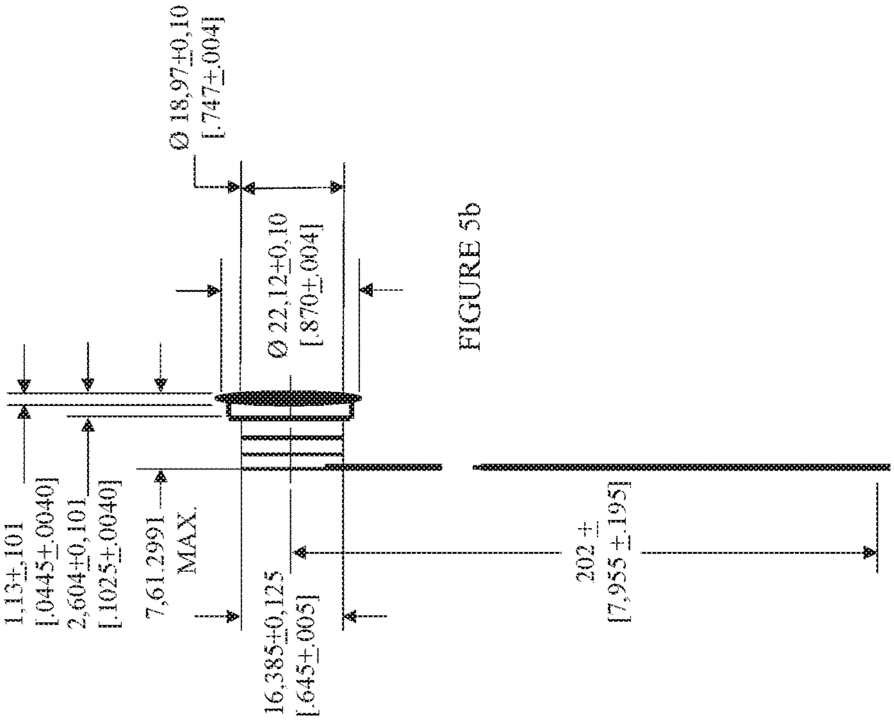
Figure 5A:
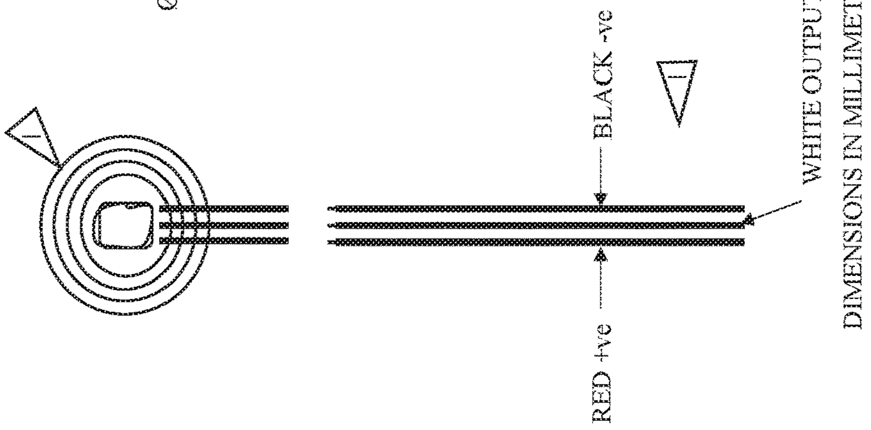

FIGS. 5*a*-5*c* provide top, side and bottom illustrations of an exemplary microphone 55 configuration, including exemplary dimensions in both millimeters and inches and hole pattern configuration 70 (FIG. 5*c*).

Figure 6:
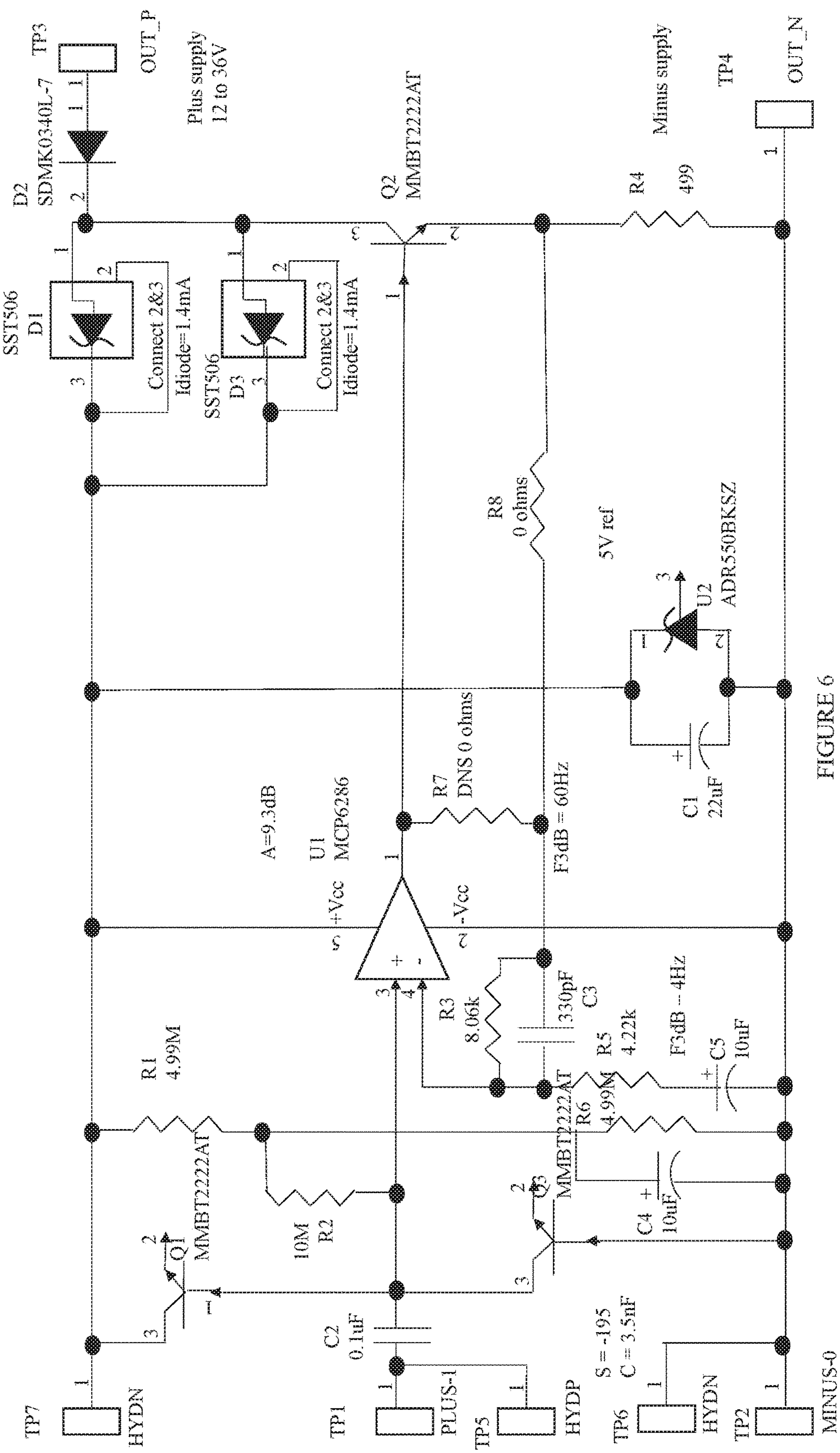
FIG. 6 illustrates an exemplary preamplifier circuit configuration within a pre-amplifier 50 of the microphone assembly of FIGS. 4*a*-4*c;*

FIG. 6 illustrates an exemplary preamplifier circuit configuration within pre-amplifier 50 of microphone assembly 30. One skilled in the art appreciates that the components of the exemplary circuit though illustrated with particular specifications and tolerances, may be substituted with varying components or combinations of components to achieve the preamplification necessary for optimization of the signal processing. Such variations are within the scope of the invention.

Figure 7:
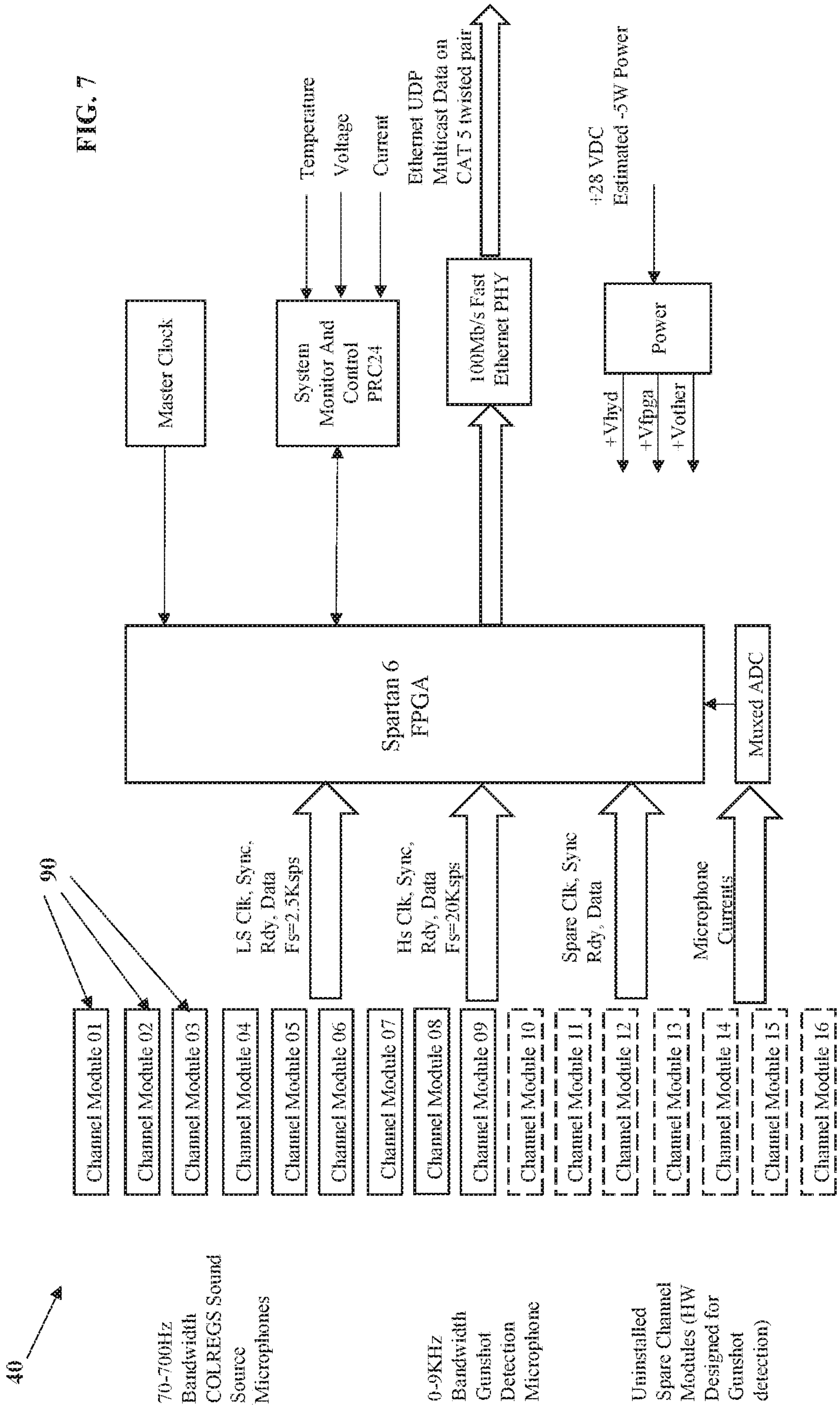
FIG. 7 illustrates an exemplary configuration of board with channel modules within a SAS hardware assembly in accordance with embodiments described herein.

FIG. 7 illustrates an exemplary configuration of the Board 40 including channel modules 90 within SAS hardware assembly 5. As illustrated, Channel Modules 01 through 08 are dedicated to 70-700 Hz bandwidth COLREGS sound source microphones 55; Channel Module 09 is dedicated to 0-9 KHz gunshot detection microphone and Channel Modules 10-16 are uninstalled spare channel modules. This Board digitizes data and sends out Ethernet packets with engineering data and timing data embedded. FIG. 7 shows both a COLREGS and gunshot detection channel; the only difference is that the gunshot channel operates at a higher sample rate in order to detect the supersonic shot wave generated by the bullet. The 70-700 Hz bandwidth range for the sound source microphones 55 is selected in accordance with the ranges set out in the COLREGS Annex III Technical Details of Sound Signal Appliances.

Figure 8:
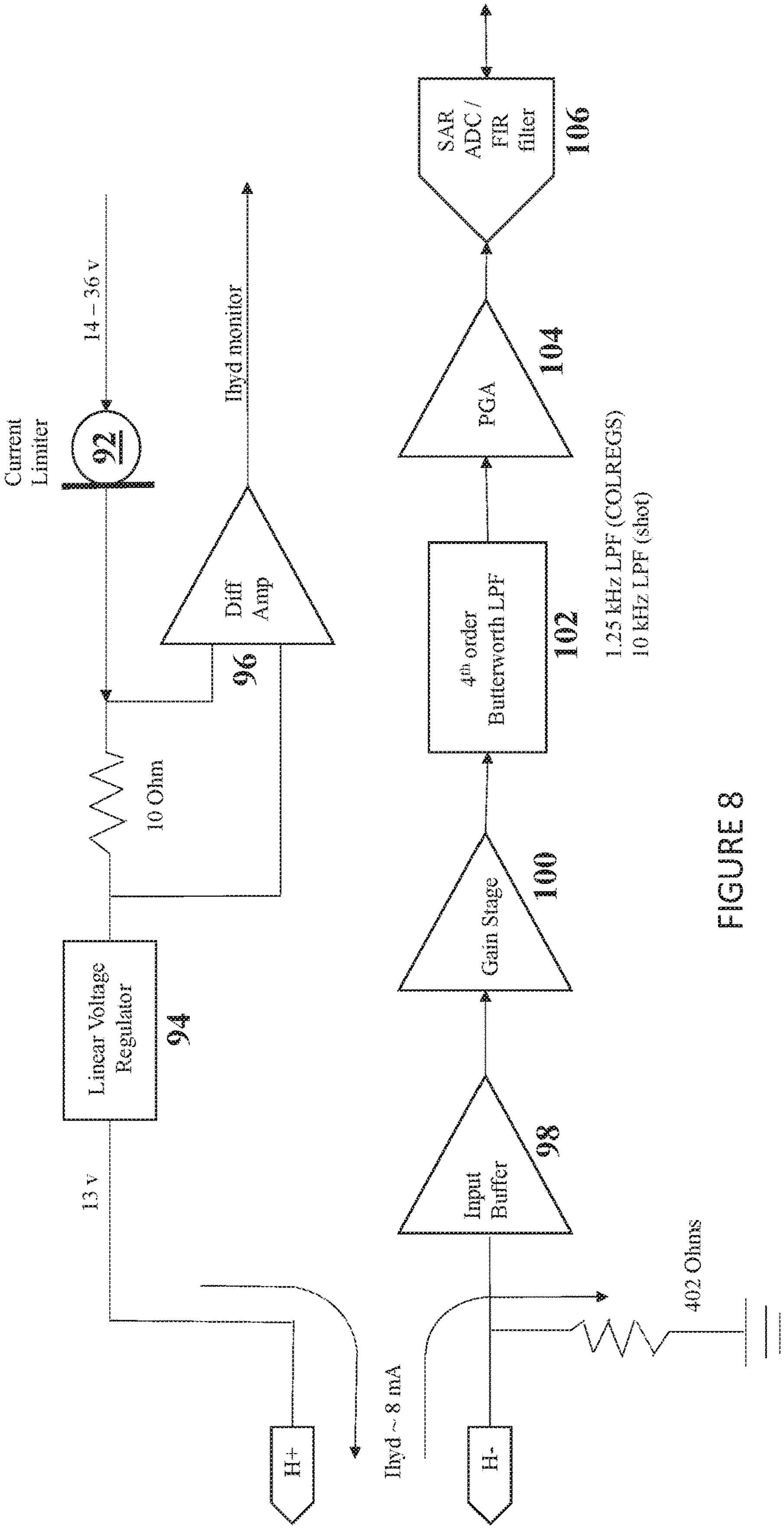
FIG. 8 illustrates an exemplary configuration of the circuitry forming the individual channel modules within a SAS hardware assembly in accordance with embodiments described herein.

FIG. 8 illustrates an exemplary configuration of the circuitry forming the individual channel modules 90 which perform the initial signal processing on the audio signals received from the sound source microphones 55. The circuitry includes an input power regulation and monitoring path having the following exemplary components: current limiter 92, linear voltage regulator 94 as well as a differential amplifier 96 for monitoring current. And the circuitry further includes a signal output path for filtering and processing the audio signals having the following exemplary components: input buffer 98, gain stage amplifier 100, low pass filter 102, programmable-gain amplifier (PGA) 104 and a successive-approximation-register (SAR) analog-to-digital (ADC) converter I finite impulse response (FIR) filter 106. The cut-off frequency for the low pass filter 102 is different for the channel module receiving COLREG microphone audio signals (1.25 kHz) and the channel module receiving gun shot microphone audio (10 kHz).

An exemplary SAS system 1 in accordance with the present embodiments is designed to conform to the COLREGS specification classifying ship whistles using rules 34 and 35. For example, the SAS system 1 described and illustrated herein is able to classify acoustic maneuvering signals identified in COLREGS Rule 34 (maneuvering & warning) and COLREGS Rule 35 (signals in restricted visibility) for both international waters and Inland waters. COLREGS Rule 34 (auditory only; visual omitted) is set forth in the text and Tables 1 and 2 below and COLREGS Rule 35 (auditory only) is set forth in text and Tables 3 and 4 as copied from the U.S. Coast Guard Navigation Center website updated as of Dec. 29, 2015.

Rule 34:

TABLE 1

| International | Inland |
|---|---|
| (a) When vessels are in sight of one another, a power-driven vessel underway, when maneuvering as authorized or required by these Rules, shall indicate that maneuver by the following signals on her whistle:<br>(i) one short blast to mean "I am altering my course to starboard";<br>(ii) two short blasts to mean "I am altering my course to port";<br>(iii) three short blasts to mean "I am operating astern propulsion | (a) When power-driven vessels are in sight of one another and meeting or crossing at a distance within half a mile of each other, each vessel underway, when maneuvering as authorized or required by these Rules:<br>(i) shall indicate that maneuver by the following signals on her whistle:<br>one short blast to mean "I intend to leave you on my port side";<br>two short blasts to mean "I intend to leave you on my starboard side";<br>three short blasts to mean "I am operating astern propulsion".<br>(ii) upon hearing the one or two blast signal of the other shall, if in agreement, sound the same whistle signal and take the steps necessary to effect a safe passing. If, however, from any cause, the vessel doubts the safety of the proposed maneuver, she shall sound the danger signal specified in Rule 34(d) and each vessel shall take appropriate precautionary action until a safe passing agreement is made. |
| (b) (Omitted, light signals) | (b) (Omitted, light signals) |
| (c) When in sight of one another in a narrow channel or fairway:<br>(i) a vessel intending to overtake another shall in compliance with Rule 9 (e)(i) indicate her intention by the following signals on her whistle:<br>two prolonged blasts following by one short blast to mean "I intend to overtake you on your starboard side"<br>two prolonged blasts followed by two short blasts to mean "I intend to overtake you on your port side"<br>(ii) the vessel about to be overtaken when acting in accordance with 9(e)(i) shall indicate her agreement by the following signal on her whistle:<br>one prolonged, one short, one prolonged and one short blast, in that order. | (c) When in sight of one another:<br>(i) a power-driven vessel intending to overtake another power-driven vessel shall indicate her intention by the following signals on her whistle:<br>one short blast to mean "I intend to overtake you on your starboard side"<br>two short blasts to mean "I intend to overtake you on your port side".<br>(ii) the power-driven vessel about to be overtaken shall, if in agreement, sound a similar signal. If in doubt she shall sound the danger signal prescribed in Rule 34(d). |

(d) When vessels in sight of one another are approaching each other and from any cause either vessel fails to understand the intentions or actions of the other, or is in doubt whether sufficient action is being taken by the other to avoid collision, the vessel in doubt shall immediately indicate such doubt by giving at least five short and rapid blasts on the whistle. Such signal may be supplemented by at least five short and rapid flashes.

(e) A vessel nearing a bend or an area of a channel or fairway where other vessels may be obscured by an intervening obstruction shall sound one prolonged blast. Such signal shall be answered with a prolonged blast by any approaching vessel that may be within hearing around the bend or behind the intervening obstruction.

(f) If whistles are fitted on a vessel at a distance apart of more than 100 meters, one whistle only shall be used for giving maneuvering and warning signals.

TABLE 2

| International | Inland |
|---|---|
| | (g) When a power-driven vessel is leaving a dock or berth, she shall sound one prolonged blast. |

TABLE 2-continued

| International | Inland |
|---|---|
| | (h) A vessel that reaches agreement with another vessel in a head-on, crossing, or overtaking situation, as for example, by using the radiotelephone as prescribed by the Vessel Bridge-to-Bridge Radiotelephone Act (85 Stat. 164; 33 U.S.C. 1201 et seq.), is not obliged to sound the whistle signals prescribed by this Rule, but may do so. If agreement is not reached, then whistle signals shall be exchanged in a timely manner and shall prevail. |

RULE 35: In or near an area of restricted visibility, whether by day or night the signals prescribed in this Rule shall be used as follows:

(a) A power-driven vessel making way through the water shall sound at intervals of not more than 2 minutes one prolonged blast.

(b) A power-driven vessel underway but stopped and making no way through the water shall sound at intervals of no more than 2 minutes two prolonged blasts in succession with an interval of about 2 seconds between them.

TABLE 3

| International | Inland |
|---|---|
| (c) A vessel not under command, a vessel restricted in her ability to maneuver, a vessel constrained by her draft, a sailing vessel, a vessel engaged in fishing and a vessel engaged in towing or pushing another vessel shall, instead of the signals prescribed in Rule 35(a) or (b), sound at intervals of not more than 2 minutes three blasts in succession, namely one prolonged followed by two short blasts. | (c) A vessel not under command, a vessel restricted in her ability to maneuver whether underway or at anchor, a sailing vessel, a vessel engaged in fishing whether underway or at anchor and a vessel engaged in towing or pushing another vessel shall, instead of the signals prescribed in Rule 35(a) or (b), sound at intervals of not more than 2 minutes three blasts in succession, namely one prolonged followed by |
| (d) A vessel engaged in fishing, when at anchor, and a vessel restricted in her ability to maneuver when carrying out her work at anchor, shall instead of the signals prescribed in Rule 35(g) sound the signal prescribed in Rule 35(c). | |

(e) A vessel towed or if more than one vessel is towed the last vessel of the tow, if manned, shall at intervals of not more than 2 minutes sound four blasts in succession, namely one prolonged followed by three short blasts. When practicable, this signal shall be made immediately after the signal made by the towing vessel.

(f) When a pushing vessel and a vessel being pushed ahead are rigidly connected in a composite unit they shall be regarded as a power-driven vessel and shall give the signals prescribed in Rule 35(a) or (b).

(g) A vessel at anchor shall at intervals of not more than 1 minute ring the bell rapidly for about 5 seconds. In a vessel 100 meters or more in length the bell shall be sounded in the forepart of the vessel and immediately after the ringing of the bell the gong shall be sounded rapidly for about 5 seconds in the after part of the vessel. A vessel at anchor may in addition sound three blasts in succession, namely one short, one long and one short blast, to give warning of her position and of the possibility of collision to an approaching vessel.

(h) A vessel aground shall give the bell signal and if required the gong signal prescribed in Rule 35(g) and shall, in addition, give three separate and distinct strokes on the bell immediately before and after the rapid ringing of the bell. A vessel aground may in addition sound an appropriate whistle signal.

(i) A vessel of 12 meters or more but less than 20 meters in length shall not be obliged to give the bell signals prescribed in Rule 35(g) and (h). However, if she does not, she shall make some other efficient sound signal at intervals of not more than 2 minutes.

(j) A vessel of less than 12 meters in length shall not be obliged to give the above mentioned signals but, if she does not, shall make some other efficient sound signal at intervals of not more than 2 minutes.

(k) A pilot vessel when engaged on pilotage duty may, in addition to the signals prescribed in Rule 35(a), (b) or (g), sound an identity signal consisting of four short blasts.

TABLE 4

| International | Inland |
|---|---|
| | (1) The following vessels shall not be required to sound signals as prescribed in Rule 35(g) when anchored in a special anchorage area designated by the Coast Guard: |

TABLE 4-continued

| International | Inland |
|---|---|
| | (i) a vessel of less than 20 meters in length,; and<br>(ii) a barge canal boat, scow, or other nondescript craft. |

Figure 9:
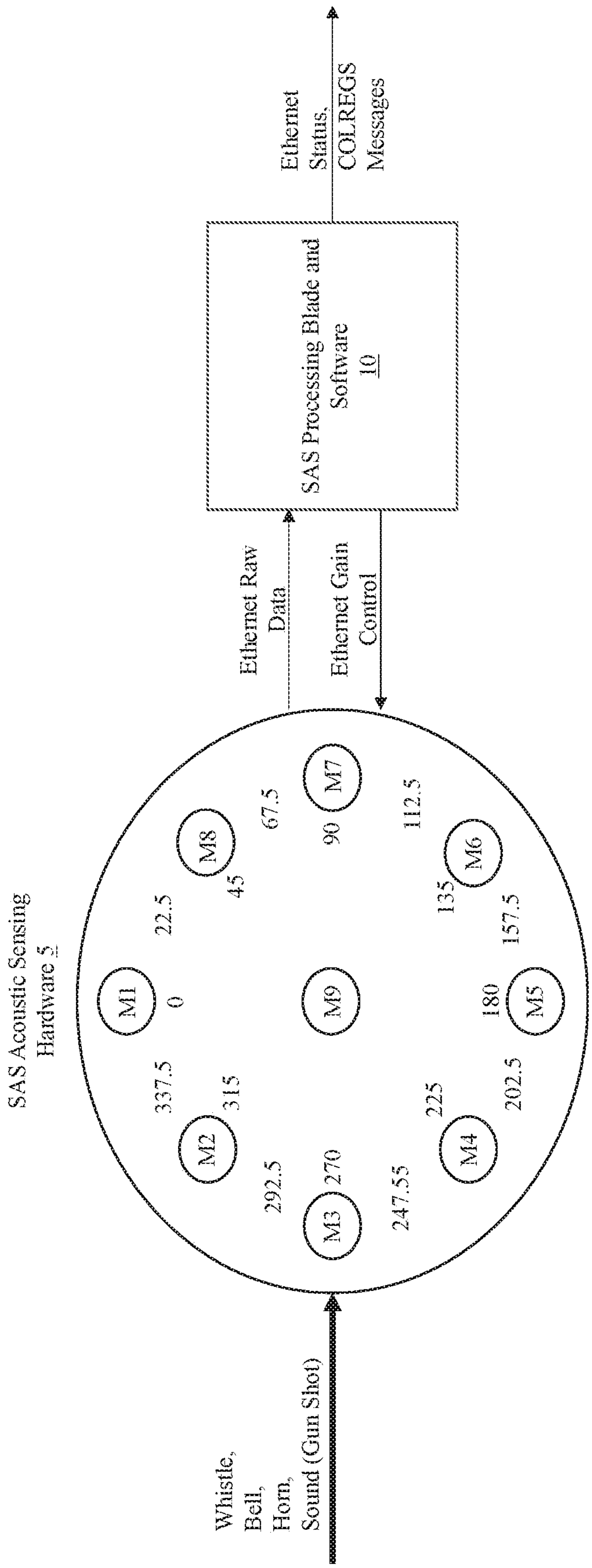
FIG. 9 highlights the modular design of the SAS system, illustrating separation of acoustic sensing hardware and SAS processing software allowing the processing hardware to be selected and swapped in as needed in accordance with embodiments described herein.

SAS localizes the whistles to within approximately +/−22.5 degrees bearing accuracy and detects COLREGS compliant whistles from vessels at frequency and audibility ranges specified in COLREGS Annex III which includes the Technical Details of Sound Signal Appliances, the substance of which is incorporated herein by reference in its entirety. The design utilizes custom acoustic sensing hardware in combination with commercial off-the-shelf (COTS) hardware to capture and process COLREGS events and, if desired, gun shots. The separation of acoustic sensing hardware 5 and SAS processing software/hardware 10 ensures a modular design that allows the processing software/hardware to be selected and swapped in/out at any time, see FIG. 9. As shown in FIG. 9, microphones M1-M9 are arranged as shown. The exemplary SAS system hardware uses well-established open system interface standards. And the exemplary SAS software is written to work on Linux without any particular hardware dependency. One skilled in the art recognizes that proprietary interfaces and software may be used. Additionally, one skilled in the art appreciates that other audio signals provided for in the COLREGS, i.e., horns, bells and other relevant audio sources may also be detected and processed by independent modules of the SAS.

The SAS acoustic sensing hardware enclosure is designed for rugged at sea use and to withstand an electromagnetic interference (EMI) environment. SAS is required to operate near RADAR and other high energy EMI sensors. The SAS sensor rejects EMI while simultaneously capturing acoustic energy for processing. The acoustic sensing hardware is designed to be salt water resistant. The SAS processing software is designed to reject constant tones and off axis interface noise generated by other ships systems. The processing also rejects repetitive mechanical ship noise such as wave slap and wind noise.

Input and output interfaces are selected based on an analysis of requirements for shipboard installation, human inspection, diagnosis, control, and supervision of the SAS platforms. To facilitate diagnostics, the SAS system reports sensor utility and state of health information.

Figure 10:
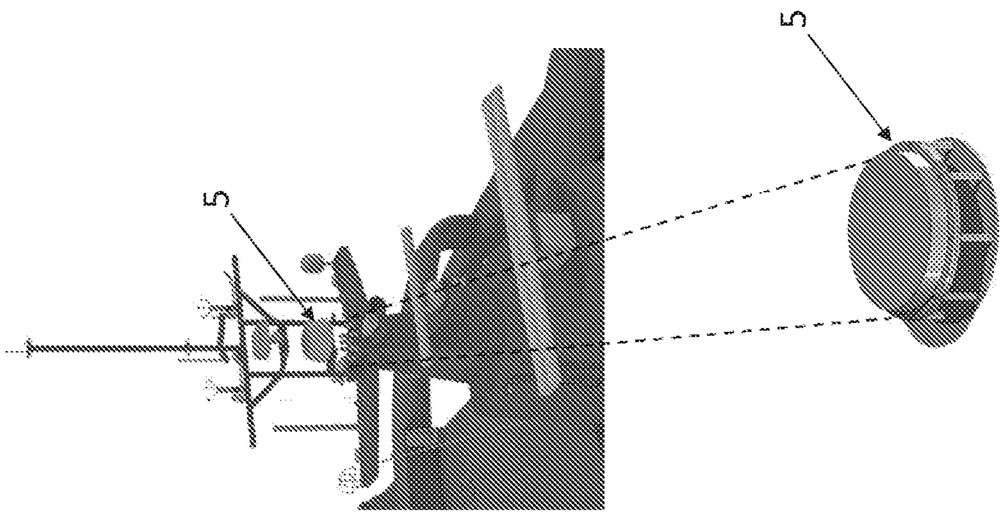
FIG. 10 provides an exemplary SAS hardware assembly placement scenario wherein there is a clear line-of-sight to potential surface vessels on any bearing in accordance with embodiments described herein.

FIG. 10 provides an exemplary SAS hardware assembly 5 placement scenario wherein there is a clear line-of-sight to potential surface vessels on any bearing. This allows for localization in bearing of COLREGS signals.

One skilled in the art recognizes the variations to the embodiments and features described herein. By way of example, the number of microphones may vary as well as the individual microphone configurations. Circuitry and hardware substitutes are contemplated in order to perform the functions described herein. Such variations are considered to be within the scope of this description.

The invention claimed is:

1. A shipboard auditory sensor system located on a first maritime vessel for processing audio signals from one or more additional maritime vessels in a vicinity of the first vessel to support navigation thereof, the shipboard auditory sensor system comprising:

an auditory sensor assembly including a microphone sensor array for sensing audio signals from the one or more maritime vessels and generating sensed audio signals, the auditory sensor assembly including a microphone array housing having a top and bottom plate separated by multiple spacers with the microphone array affixed to an inside facing surface of one of the top and bottom plates;

wherein the microphone sensor array includes multiple individual microphone assemblies, each of the individual microphone assemblies including a microphone housing with a pre-amplifier and a microphone therein.

2. The shipboard auditory sensor system of claim 1, wherein the auditory sensor assembly further includes:

a filter and a data acquisition board attached to the microphone array housing, wherein the sensed audio signals are determined by the auditory sensor assembly to be in a first specified auditory range and are indicative of a status of the one or more additional maritime vessels, wherein the auditory sensor assembly formats the determined audio signals into audio data packets to support navigation of the first vessel; and a processing server on the ship for receiving the audio data packets from the auditory sensor assembly, the processing server being programmed to run the received audio data packets through multiple algorithms to support navigation of the first vessel.

3. The shipboard auditory sensor system of claim 2, wherein the multiple algorithms include: a sound detection algorithm and a marine vessel status algorithm.

4. The shipboard auditory sensor system of claim 2, wherein the multiple algorithms include COLREGS audio classifications in accordance with COLREGS rules 34 and 35.

5. The shipboard auditory sensor system of claim 2, wherein the multiple algorithms further include: an operating environment algorithm for determining if the ship is in international waters or inland waters.

6. The shipboard auditory sensor system of claim 2, wherein the first specified auditory range is 70 to 700 Hz.

7. An auditory sensor assembly for sensing audio signals from one or more maritime vessels to assist a primary maritime vessel with navigation and generating sensed audio signals, the auditory sensor assembly comprising:

a microphone array housing having a top and bottom plate separated by multiple spacers;

a microphone array affixed to an inside facing surface of one of the top and bottom plates, wherein the microphone array includes multiple individual microphone assemblies, each of the individual microphone assemblies including a microphone housing with a pre-amplifier and a microphone therein;

a filter and a data acquisition board attached to the microphone array housing, wherein the sensed audio signals are determined by the auditory sensor assembly to be in a first specified auditory range and are indicative of a status of the one or more maritime vessels, said status being useful for assisting the primary maritime vessel with navigation.

8. The auditory sensor assembly of claim 7, wherein the first specified auditory range is 70 to 700 Hz.

9. An auditory sensor system for processing audio signals from one or more surface maritime vessels in a vicinity of an autonomous maritime vessel to support autonomous navigation of the vessel, the auditory sensor comprising:

an assembly of multiple microphones;

a power filter connected to the assembly; and a data acquisition board in communication with the assembly, wherein one or more of the multiple microphones receives audio signals from one or more surface maritime vessels in a vicinity of the autonomous maritime vessel, wherein the received audio signals are filtered by the power filter to determine which audio signals are in a first predetermined auditory range which is indicative of a status of the one or more surface maritime vessels, the status being acquired by the data acquisition board to support autonomous navigation of the autonomous maritime vessel.

10. The auditory sensor system of claim 9, wherein each of the multiple microphones comprises: a microphone operating within the first predetermined auditory range and a preamplifier circuit.

11. The auditory sensor system of claim 9, wherein the data acquisition board comprises: at least one channel module for each of the multiple microphone assemblies, a programmable gate array, an analog-to-digital converter and an Ethernet interface.

12. The auditory sensor system of claim 9, further comprising:

a processing server on the autonomous maritime vessel for receiving audio data packets from the auditory sensor, the processing server being programmed to run the received audio data packets through multiple algorithms to support autonomous navigation of the autonomous maritime vessel.

13. The auditory sensor system of claim 12, wherein the multiple algorithms include: a sound detection algorithm and a marine vessel status algorithm.

14. The auditory sensor system of claim 13, wherein the marine vessel status algorithm includes COLREGS audio classifications in accordance with COLREGS rules 34 and 35.

15. The auditory sensor system of claim 14, wherein the multiple algorithms further include: an operating environment algorithm for determining if the autonomous maritime vessel is in international waters or inland waters.

16. The auditory sensor system of claim 9, wherein the first predetermined auditory range is 70 to 700 Hz.

17. The auditory sensor system of claim 9, wherein the auditory sensor further includes a gunshot detection microphone operating in a second predetermined audio range.

18. The auditory sensor system of claim 17, wherein the data acquisition board further comprises: at least one channel module for each of the multiple microphones, at least one channel module for the gunshot detection microphone, a programmable gate array, and analog-to-digital converter and an Ethernet interface.

19. The auditory sensor system of claim 17, wherein the second predetermined auditory range is greater than 0 and up to 9 KHz.

* * * * *